United States Patent [19]

Smart

[11] Patent Number: 4,497,553
[45] Date of Patent: Feb. 5, 1985

[54] SHUTTER MECHANISM

[75] Inventor: David C. Smart, Penfield, N.Y.

[73] Assignee: Eastman Kodak Company, Rochester, N.Y.

[21] Appl. No.: 489,272

[22] Filed: Apr. 27, 1983

[51] Int. Cl.³ .......................... G03B 15/04; G03B 9/16
[52] U.S. Cl. ...................................... 354/135; 354/261
[58] Field of Search ............... 354/135, 142, 130, 261, 354/253

[56] References Cited

U.S. PATENT DOCUMENTS

| | | | |
|---|---|---|---|
| 3,785,260 | 1/1974 | Penick | 95/11.5 R |
| 3,887,934 | 6/1975 | Ettischer | 354/251 |
| 3,898,682 | 8/1975 | Ettischer | 354/253 |
| 4,183,648 | 1/1980 | Harvey et al. | 354/135 |
| 4,349,259 | 9/1982 | Meyer et al. | 354/135 |

FOREIGN PATENT DOCUMENTS

| | | | |
|---|---|---|---|
| 717295 | 7/1965 | Canada | 95/78 |
| 2000307 | 1/1979 | United Kingdom . | |

Primary Examiner—William B. Perkey
Attorney, Agent, or Firm—Roger A. Fields

[57] ABSTRACT

Opening and closing blades of a shutter are actuated substantially simultaneously with flash firing means igniting a chemical flash lamp. However, initial opening of the shutter is delayed after flash ignition to synchronize full opening of the shutter with the peak intensity of the ignited flash lamp. In operation, the actuated blades are moved in a forward direction, jointly, to prevent shutter opening, and are returned in a reverse direction, successively, with the opening blade moving ahead of the closing blade, to open the shutter for a relatively short exposure time.

14 Claims, 5 Drawing Figures

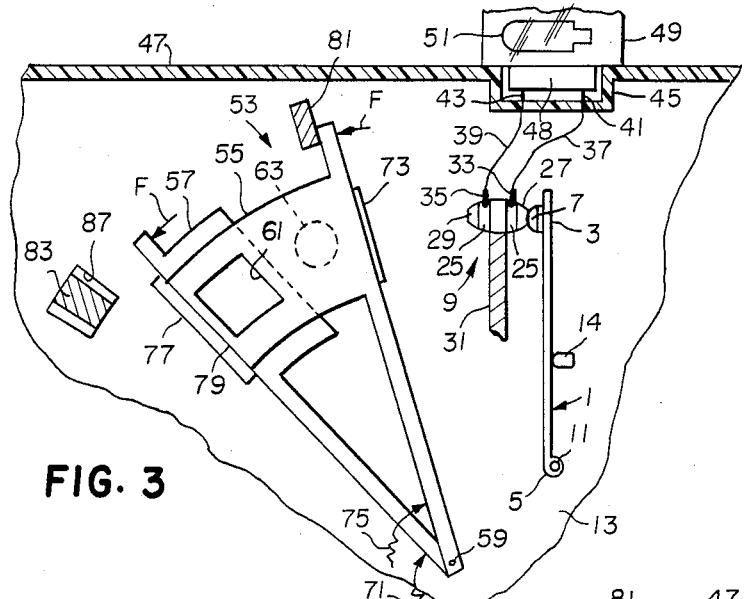
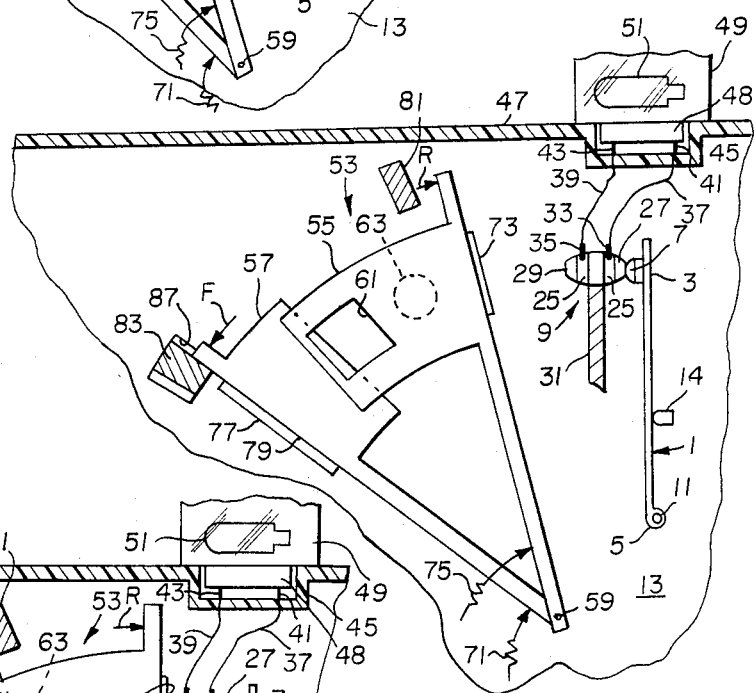
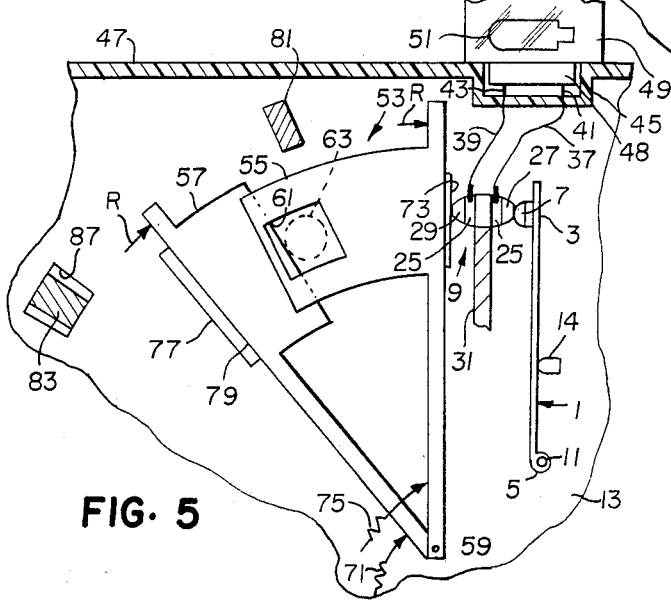

SHUTTER MECHANISM

BACKGROUND OF THE INVENTION

1. Field of the Invention

The invention generally relates to shutter mechanisms in photographic cameras useable with chemical flash lamps. More particularly, the invention relates to an improved shutter mechanism for synchronizing film exposure with the peak intensity of an ignited flash lamp.

2. Background Art-Problems

Relatively fast shutter speeds may be used in combination with modern high-speed amateur color film (e.g. ASA 400) to reduce the effects of camera and/or subject motion, thereby resulting in sharper pictures. Some popularly priced amateur cameras take advantage of the extra sharpness that can be achieved with high-speed films by having fast (e.g. 1/200 to 1/500 second) shutter speeds for daylight operation. Unfortunately, the performance of low priced amateur cameras employing chemical flash illumination for indoor operation typically has not similarly benefited from the advent of high-speed films. One popular format for chemical flash employs a flash firing mechanism including a piezoelectric crystal that is struck by a hammer to generate a pulse of electricity which ignites the contents of a chemical flash lamp. Generally, the piezoelectric crystal is struck at the same time that the shutter begins to open, or shortly before, as for example in published U.K. Pat. Appl. No. GB 2000307 and U.S. Pat. No. 4,183,648. FIG. 1 of the drawings shows a plot of the light intensity produced by a piezoelectrically ignited flash lamp versus time. At time 0, the piezoelectric crystal is struck. As can be seen in FIG. 1, it took approximately 13 milliseconds from the time that the piezoelectric crystal was struck to the instant when the output of the flash lamp reached its peak intensity. If a relatively fast shutter speed is employed (e.g. 2 to 10 milliseconds; 1/500 to 1/100 second) and the shutter begins to open upon the hammer striking the piezoelectric crystal, the shutter will close before the flash intensity has passed its peak. Much of the flashlight will therefore be wasted. To overcome this problem, many inexpensive cameras are designed to employ a relatively slow shutter speed (e.g. 30 milliseconds) in the flash mode. By using such a slow shutter speed, the shutter is sure to be open when the flash intensity passes its peak. Although this technique makes full use of the flash illumination available, it sacrifices some sharpness potential in the high speed film.

An improvement to using a slow shutter speed in the flash mode is to delay opening of the shutter until shortly before the piezoelectrically ignited flash lamp reaches its peak intensity, then to open the shutter for a relatively short exposure time in synchronization with the peak flash intensity. It has been a problem, however, to design a simple shutter mechanism that could be actuated about the same time as the flash lamp is ignited and, after an initial delay, would produce the desired relatively short exposure time. One such shutter mechanism is shown in U.S. Pat. No. 4,349,259, and includes a primary shutter blade having an intermediate opening and a flap-like auxiliary blade fixed on the primary blade adjacent the opening. In operation, the primary blade is actuated in synchronization with piezoelectric ignition of a flash lamp. A stationary cam folds the auxiliary blade over the opening in the primary blade as the opening passes over an exposure aperture, thereby delaying film exposure with respect to flash ignition. Once clear of the cam, the auxiliary blade straightens by virtue of its own restoring force to uncover the opening. Then, on spring-urged return movement of the primary blade, the opening passes over the exposure aperture to effect film exposure substantially simultaneously with the ignited flash reaching its peak intensity.

While the shutter mechanism in the '259 patent delays shutter opening after flash ignition to synchronize film exposure with the peak intensity of an ignited flash, it suffers from a number of problems. For example, in low ambient temperatures (e.g. 20° F.) the auxiliary blade will become less flexible and lose some degree of its restoring ability, possibly to the point where it may contact the cam during return movement of the primary blade, thereby stalling the primary blade. Moreover the use of a single blade having an intermediate opening, i.e., the primary blade, for uncovering and recovering the exposure aperture, makes it difficult to accurately vary the exposure time.

SUMMARY OF THE INVENTION-SOLUTION

The above-described problems regarding the synchronization of a chemical flash and a camera shutter are believed solved by the invention. According to the invention, there is provided an improved shutter mechanism which is actuated substantially simultaneously with flash firing means igniting a chemical flash lamp; however, initial opening of the shutter is delayed after flash ignition to synchronize its full opening with the peak intensity of the ignited flash lamp.

Specifically, the shutter mechanism comprises:
an opening blade and a closing blade for opening and closing the shutter, respectively;
means for effecting movement of the opening and closing blades, substantially simultaneously with the firing means igniting a flash lamp, in a forward direction without opening the shutter; and
return means for moving the opening and closing blades in a reverse direction, successively, or simultaneously in staggered relation, with the opening blade leading the closing blade to open and close the shutter, whereby initial opening of the shutter is delayed after flash ignition to synchronize its full opening with the peak intensity of an ignited flash lamp.

In a preferred embodiment of the invention, the flash firing means is a piezoelectric crystal that receives a mechanical shock from a hammer to ignite a chemical flash lamp. The opening and closing blades each have covering and uncovering positions, relative to an exposure aperture. The shutter is closed when at least one of the blades is in a covering position and is open when both of the blades are in respective uncovering positions. Means support the opening and closing blades for movement by the mechanical shock to the piezoelectrical crystal in a forward direction to covering and uncovering positions, respectively, without opening the shutter. Then, return means first moves the opening blade in a reverse direction from its covering position to an uncovering position, to open the shutter, and then moves the closing blade in the reverse direction from an uncovering position to a covering position, to close the shutter. The blades are initially coupled for actuation jointly in the foward direction to prevent shutter opening, and thereafter uncouple to permit movement successively in the reverse direction for shutter opening and closing. The return means includes respective spaced stops off which the opening blade first rebounds and the closing blade then rebounds, and springs for separately urging the opening and closing blades to respective uncovering and covering positions. The stop off which the closing blade rebounds is adjustable to vary the interval between successive movement of the blades in the reverse direction to change the exposure time.

BRIEF DESCRIPTION OF THE DRAWINGS

The invention will be described with respect to the drawings, wherein:

FIGS. 2-5 are a series of elevational views of an improved shutter mechanism according to a preferred embodiment of the invention, illustrating the operation of shutter opening and closing blades to synchronize film exposure with the peak intensity of a piezoelectrically ignited chemical flash lamp.

DESCRIPTION OF THE PREFERRED EMBODIMENT

Because cameras are well known, this description will be directed in particular to elements forming part of or cooperating directly with apparatus in accordance with the present invention. It is to be understood, however, that camera elements not specifically shown or described may take various forms known to those skilled in the camera art.

Figure 2:
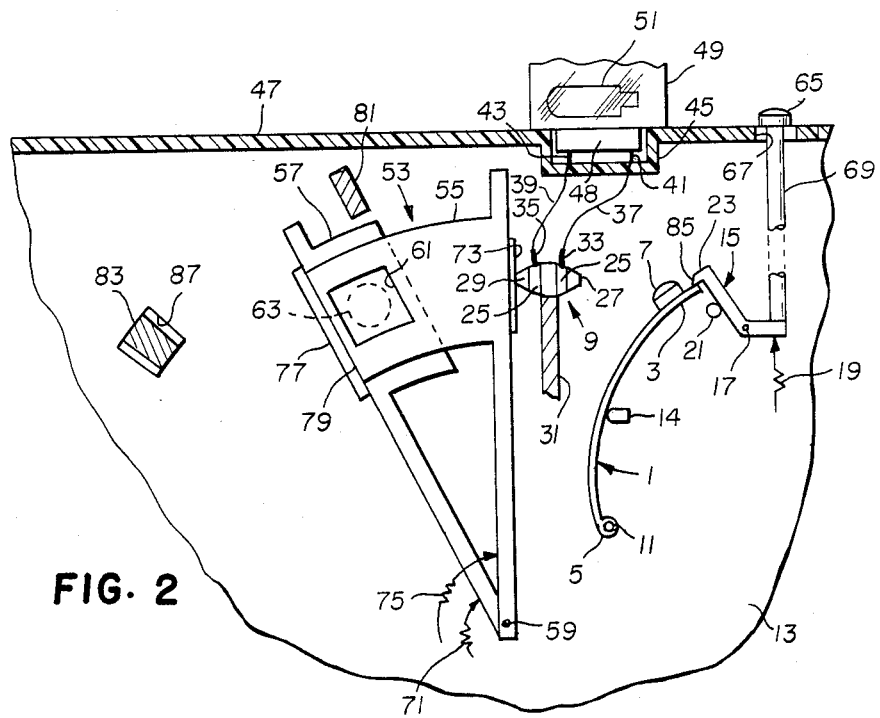

Referring now to the drawings, there is shown synchronization apparatus for flash firing and shutter operation in a still picture camera. In FIG. 2, a piezoelectric firing spring 1 is illustrated in the form of an elongated leaf spring having opposite end portions 3 and 5. Included on one end portion 3 of the firing spring 1 is a hammer 7 for striking a piezoelectric generator indicated generally as 9. When struck in this manner, the piezoelectric generator 9 produces an electric pulse for flash firing. The other end portion 5 of the firing spring 1 is fixed by a mounting pin 11 to a camera plate 13. A fulcrum 14 for the firing spring 1 is disposed intermediate its opposite end portions 3 and 5 to serve as a support about which the firing spring is flexed.

Provided within the camera is a firing spring latch 15 which is pivotally movable about a mounting pin 17 fixed to the plate 13. The latch 15 is biased by a spring 19 to pivot in a counterclockwise direction, as viewed in FIG. 2, against a fixed stop 21. When the latch 15 is located against the stop 21, an end portion 23 of the latch is oriented to engage the end portion 3 of the firing spring 1 and, thereby, releasably retain the firing spring in a tensioned, i.e., cocked position, shown in FIG. 2. When released by the latch 15, the firing spring 1 swings to a firing, i.e., impacting position, shown in FIG. 3; whereupon, the hammer 7 strikes the piezoelectric generator 9 to produce an electric pulse for flash firing.

The piezoelectric generator 9 includes a piezoelectric crystal 25 and a pair of opposed anvil end portions 27 and 29 located at either side of the crystal. As shown in FIG. 2, the piezoelectric generator 9 is mounted within the camera on a rib member 31 which may be fixed to the plate 13. A pair of terminals 33 and 35, secured to the crystal 25, are connected to respective electrical leads 37 and 39 which lead to a pair of resilient electrical contacts 41 and 43. The electrical contacts 41 and 43 are located within a flash-receiving socket 45 formed within a top wall 47 of the camera. The socket 45 is configured to receive the stem 48 of a multiple flash unit 49, such as a General Electric "Flip Flash", which contains a number of chemical flash lamps 51 (only one is illustrated). The stem 48, when received in the socket 45, makes an electrical connection with the contacts 41 and 43, thereby electrically coupling the flash unit 49 to the piezoelectric crystal 25.

A shutter, indicated generally as 53, includes an opening blade 55 and a closing blade 57 pivotally movable with respect to each other about a common mounting pin 59 on the camera plate 13 to open and close the shutter. The opening blade 55 has a rectangular-shaped opening 61 which is aligned with an exposure aperture 63 in the camera plate 13, and is of sufficient dimensions, to uncover the exposure aperture, i.e., open the shutter 53, as shown in FIG. 5. The various positions of the opening and closing blades 55 and 57, relative to the exposure aperture 63, as shown in FIGS. 2-5, and the condition of the shutter 53 during the respective blade positions, are set forth in the table below:

| FIG. No. | Condition of Shutter 53 | Position of Opening Blade 55 | Position of Closing Blade 57 |
|---|---|---|---|
| 2 | Closed | Uncovering | Covering |
| 3 | Closed | Covering | Uncovering |
| 4 | Closed | Covering | Uncovering |
| 5 | Open | Uncovering | Uncovering |

By this arrangement, therefore, the shutter 53 is closed to prevent film exposure whenever either one of the blades is in a covering position, relative to the exposure aperture 63, and is open to effect film exposure when both of the blades are in respective uncovering positions relative to the exposure aperture.

OPERATION

When the camera is set or cocked for picture-taking, as shown in FIG. 2, and it is desired to initiate a film exposure, a shutter release button 65, adjacent an opening 67 in the top wall 47 of the camera, is manually depressed. This causes a pin member 69, which extends from the shutter release button 65 through the wall opening 67, to pivot the latch 15 in a clockwise direction about its mounting pin 17, separating the end portion 23 of the latch from the end portion 3 of the firing spring 1. The resulting release of the firing spring 1 allows it to rapidly swing to the firing position, shown in FIG. 3; whereupon, the hammer 7 sharply strikes the anvil end portion 27 of the piezoelectric generator 9 to induce a mechanical shock in the piezoelectric crystal 25. The mechanical shock is sufficient to cause the crystal 25 to produce an electric pulse, which is transmitted along the electrical leads 37 and 39 to the electrical contacts 41 and 43 in the flash-receiving socket 45. The electric pulse ignites the contents of one of the chemical flash lamps 51 contained in the multiple flash unit 49 in the flash-receiving socket 45.

As shown in FIG. 2, a spring 75 urges the opening blade 55 in a clockwise direction about the mounting pin 59 to normally locate a tab 73 on the opening blade against the anvil end portion 29 of the piezoelectric crystal 25. Moreover, a spring 71 similarly urges the closing blade 57 to normally locate a tab 77 on the closing blade against an edge portion 79 of the opening blade 55. Consequently, when the shock wave developed by the mechanical shock to the crystal 25 is transmitted through the anvil end portion 29 of the crystal to the tab 73 on the opening blade, the opening and closing blades are actuated, substantially simultaneously with the piezoelectric ignition of a flash lamp 51, to pivot jointly in a forward direction F, as shown in FIG. 3, without opening the shutter 53. Then the opening blade 55 rebounds off a stop 81 on the camera plate 13 and is pivoted by the spring 75 in a reverse direction R, as shown in FIG. 4, thereby separating from the closing blade 57, which continues to pivot in the forward direction F. Shortly thereafter, the closing blade 57 rebounds off a stop 83 on the camera plate 13 and is pivoted by the spring 71 in the reverse direction R behind the opening blade 55, as shown in FIG. 5. Such movement of the opening and closing blades 51 and 53 in a staggered relation, with the opening blade leading the closing blade, causes the shutter 53 to open as the rectangular-shaped opening 61 in the opening blade (uncovered, for the most part, by the closing blade) initially passes over the exposure aperture 63. Then, the shutter 53 is caused to close as the closing blade 51 intially moves over the exposure aperture 63. Both the opening and closing blades come to rest as shown in FIG. 2.

Figure 1:
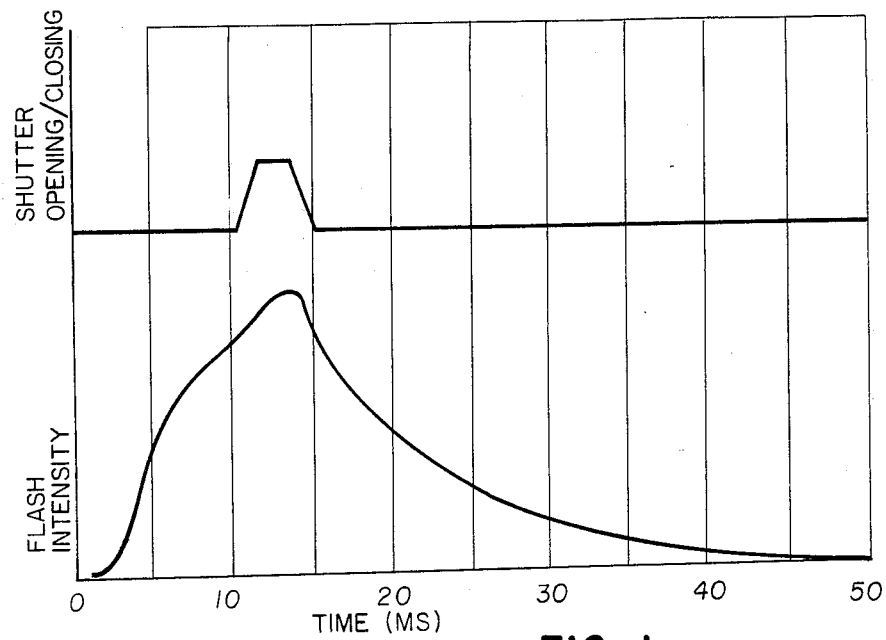
FIG. 1 is a graph showing a plot of light intensity from a piezoelectrically ignited chemical flash lamp versus time and a plot of shutter opening and closing versus time.

In the preferred embodiment of the invention, the mass of the opening and closing blades 55 and 57, the impact force of the firing spring 1, the respective locations of the stops 81 and 83, and the return force of the springs 71 and 75 were chosen, as shown in FIG. 1, (a) to initiate opening of the shutter 53 approximately 11 milliseconds after the piezoelectric generator 9 produces an electric pulse to ignite a flash lamp 51; (b) to synchronize full opening of the shutter with the peak intensity of the ignited flash lamp at approximately 13 milliseconds; and (c) to close the shutter approximately 2 milliseconds later. Thus, a relative short exposure time is effected and the shutter is fully open at the peak flash intensity to optimumly utilize the flashlight.

Known means (not shown) may be included for returning the piezoelectric firing spring 1 to the cocked position, shown in FIG. 1. For example, the firing spring 1 may be returned by a lever movable by engagement with a film advancing mechanism in the camera. As the firing spring 1 is returned to the cocked position, its end portion 3 will contact a cam surface 85 on the end portion 23 of the latch 15. The latch 15 is then pivoted by the end portion 3 of the firing spring 1 in a clockwise direction about the mounting pin 17 to permit re-engagement of the latch end portion 23 with the spring end portion 3.

Although the drawing shows the opening and closing blades 55 and 57 disposed for actuation by a mechanical shock received from the piezoelectric generator 9 when the generator is struck by the hammer 7, it will be appreciated by those having ordinary skill in the art that other embodiments, such as a striker device, for actuating the blades are possible in accordance with the teachings of the invention. Moreover, the stop 83 off which the closing blade rebounds may be made adjustable to vary the interval between successive movement of the opening and closing blades in the reverse direction R, thereby to change the exposure time. One possible way of making the stop 83 adjustable is to seat it for movement in a slot 87, as shown in FIG. 2, between several discrete locations. A manually operated cam, not shown, may be provided to effect such movement of the stop 83.

The invention has been described in detail with particular reference to a preferred embodiment thereof, but it will be understood that variations and modifications can be effected within the spirit and scope of the invention.

I claim:

1. In photographic camera apparatus of the type wherein flash firing means ignites a chemical flash lamp, and a shutter is fully open at the peak intensity of an ignited flash lamp, the improvement comprising:

an opening blade for opening said shutter and a closing blade for closing said shutter;

means for effecting movement of said opening and closing blades, substantially simultaneously with said firing means igniting a flash lamp, in a forward direction without opening said shutter; and return means for first moving said opening blade and then moving said closing blade in a reverse direction to open and close said shutter, whereby initial opening of said shutter is delayed after flash ignition to synchronize its full opening with the peak intensity of an ignited flash lamp.

2. The improvement as recited in claim 1, wherein said opening and closing blades are supported for pivotal movement about a common axis as said blades move in the forward and reverse directions.

3. In photographic camera apparatus of the type wherein flash firing means ignites a chemical flash lamp, and a shutter is fully open at the peak intensity of an ignited flash lamp, the improvement comprising:

an opening blade for opening said shutter and a closing blade for closing said shutter;

means for effecting movement of said opening and closing blades, substantially simultaneously with said firing means igniting a chemical flash, in a forward direction without opening said shutter; and return means for moving said opening and closing blades in a reverse direction in staggered relation with said opening blade leading said closing blade to open and close said shutter, whereby initial opening of said shutter is delayed after flash ignition to synchronize its full opening with the peak intensity of an ignited flash lamp.

4. In photographic camera apparatus of the type wherein flash firing means ignites a chemical flash lamp, and a shutter is fully open at the peak intensity of an ignited flash lamp, the improvement comprising:

an opening blade and a closing blade, movable relative to each other, for opening and closing said shutter to uncover and recover an exposure aperture;

means for effecting joint movement of said opening and closing blades, substantially simultaneously with said firing means igniting a flash lamp, in a forward direction over the exposure aperture without opening said shutter; and return means for successively moving said opening and closing blades in a reverse direction over the exposure aperture, with said opening blade moving ahead of said closing blade, to open and close said shutter, whereby initial opening of said shutter is delayed after flash ignition to synchronize its full opening with the peak intensity of an ignited flash lamp.

5. The improvement as recited in claim 4, wherein said opening and closing blades are normally arranged in an overlapping relation over the exposure aperture to close said shutter.

6. The improvement as recited in claim 4, wherein said return means includes respective spaced stops off which said opening blade first rebounds and said closing blade then rebounds, for successive movement in the reverse direction.

7. In photographic camera apparatus of the type wherein flash firing means ignites a chemical flash lamp, and a shutter is fully open at the peak intensity of an ignited flash lamp, the improvement comprising:
  a shutter opening blade and a shutter closing shutter blade each having covering and uncovering positions relative to an exposure aperture;
  means for effecting movement of said opening and closing blades, substantially simultaneously with said firing means igniting a flash lamp, in a forward direction to covering and uncovering positions, respectively, without opening said shutter; and
  return means for first moving said opening blade and then moving said closing blade in a reverse direction to uncovering and covering positions, respectively, to open and close said shutter, whereby initial opening of said shutter is delayed after flash ignition to synchronize its full opening with the peak intensity of an ignited flash lamp.

8. The improvement as recited in claim 7, wherein said shutter is open when said opening and closing blades are in respective uncovering positions and said shutter is closed when at least one of said blades is in a covering position.

9. The improvement as recited in claim 7, wherein said return means includes respective spaced stops off which said opening and closing blades rebound for movement in the reverse direction in staggered relation with said opening blade leading said closing blade.

10. The improvement as recited in claim 7, wherein said return means includes respective spaced stops off which said opening blade in a covering position first rebounds and said closing blade in an uncovering position then rebounds, for successive movement in the reverse direction, and spring means for separately urging said opening and closing blades in the reverse direction to respective uncovering and covering positions.

11. The improvement as recited in claim 10, wherein said stop off which said closing blade rebounds is adjustable to vary the interval between successive movement of said opening and closing blades in the reverse direction.

12. In photographic camera apparatus of the type wherein a piezoelectric generator receives a mechanical shock to produce an electric pulse for igniting a chemical flash lamp, and a shutter is fully open at the peak intensity of an ignited flash lamp, the improvement comprising:
  a shutter opening blade and a shutter closing blade each having covering and uncovering positions relative to an exposure aperture;
  means supporting said opening and closing blades for actuation by the mechanical shock to said generator, for movement in a forward direction to covering and uncovering positions, respectively;
  return means for first moving said opening blade in a reverse direction to an uncovering position, and then moving said closing blade in the reverse direction to a covering position, to open and close said shutter; and
  means for coupling said opening and closing blades for movement jointly in the forward direction to prevent shutter opening and for uncoupling said blades to permit their independent movement in the reverse direction for shutter opening and closing.

13. The improvement as recited in claim 12, wherein said supporting means locates said opening blade in an uncovering position in contact with said piezoelectric generator to receive a mechanical shock to said generator for driving said opening and closing blades in the forward direction.

14. The improvement as recited in claim 12, wherein said shutter is open when said opening and closing blades are in respective uncovering positions and said shutter is closed when one of said blades is in a covering position.

* * * * *